United States Patent [19]

Highsmith

[11] Patent Number: 4,521,452

[45] Date of Patent: Jun. 4, 1985

[54] GEL-FORMING COMPOSITIONS AND THE USE THEREOF

[76] Inventor: Ronald E. Highsmith, 28 E. Austin St., Skaneteles, N.Y. 13152

[21] Appl. No.: 238,489

[22] Filed: Feb. 26, 1981

Related U.S. Application Data

[63] Continuation-in-part of Ser. No. 88,126, Oct. 25, 1979, abandoned.

[51] Int. Cl.$^3$ .............................. B05C 1/16; B05D 5/10
[52] U.S. Cl. ..................................... 427/136; 166/295; 405/264; 427/140; 427/385.5; 427/393.6; 525/157; 525/381; 525/382
[58] Field of Search ............... 427/136, 140, 336, 426, 427/393.6, 385.5; 405/264; 166/293, 294, 295; 252/316; 71/64 SC; 52/744; 47/DIG. 10, 58; 525/1, 6, 154, 381, 382, 159; 260/29.6 N; 264/182, 184

[56] References Cited

U.S. PATENT DOCUMENTS

| | | | |
|---|---|---|---|
| 2,796,656 | 6/1957 | Schappel et al. | 264/182 |
| 2,801,983 | 8/1957 | Dixon et al. | 405/264 |
| 2,940,729 | 6/1960 | Rakowitz | 166/295 |
| 3,223,163 | 12/1965 | Koch et al. | 405/264 |
| 3,286,475 | 11/1966 | Adams | 405/264 |
| 3,437,625 | 4/1969 | Bonnel et al. | 166/295 |
| 3,488,720 | 1/1970 | Nagy et al. | 525/382 |
| 3,503,946 | 3/1970 | Scanley et al. | 525/382 |
| 3,684,733 | 8/1972 | Bannister et al. | 166/294 |
| 3,733,386 | 5/1973 | Shimoda et al. | 264/182 |
| 3,759,197 | 9/1973 | Bracke | 427/136 |
| 3,767,755 | 10/1973 | Takeya et al. | 264/182 |
| 3,979,348 | 9/1976 | Ballweber et al. | 260/29.6 N |
| 4,013,606 | 3/1977 | Ballweber et al. | 525/157 |
| 4,064,940 | 12/1977 | Sparlin | 166/295 |
| 4,094,150 | 6/1978 | Clarke | 405/264 |
| 4,098,337 | 7/1978 | Argabright et al. | 166/294 |
| 4,107,119 | 8/1978 | Kameyama et al. | 525/382 |
| 4,155,405 | 5/1979 | Vio | 405/264 |

Primary Examiner—S. L. Childs

[57] ABSTRACT

Preparation of polymeric gels, filaments, and films prepared by producing a uniform dispersion of a water soluble acrylamide polymer or copolymer in the water insoluble reaction product of certain water soluble aldehydes and water soluble primary amines. The reaction is carried out in aqueous solution. Gel formation time may range from a few seconds to several minutes depending on selection of appropriate parameters. The gels have many desirable properties such as preparation from relatively nontoxic components, superior adhesion, toughness, and water impermeability. The gels have many uses such as adhesives, sealing cracks and joints in pipes, stabilizing earthen formations, waterproofing subgrade construction and as intermediates in the preparation of films, filaments, and membranes. Gels for these purposes may be treated with carbon dioxide to provide a color change and additional surface hardness.

28 Claims, No Drawings

GEL-FORMING COMPOSITIONS AND THE USE THEREOF

CROSS REFERENCES TO RELATED APPLICATIONS

This is a continuation-in-part application of my co-pending application Ser. No. 088,126, filed Oct. 25, 1979, now abandoned.

BACKGROUND OF THE INVENTION

The invention relates to compositions for the preparation of polymeric gels, the polymeric gels and their uses, and more particularly to a composition including adequate proportions of certain polymers, aldehydes and amines to form a polymeric gel. Such polymeric gels with appropriate gelation times are useful for reducing or eliminating the flow of water through surfaces and earthen formations, as adhesives and for the formation of fibers, filaments, films and membranes; and in soil stabilization.

A primary utilization of gels in accordance with this invention is the reduction of water infiltration in structures such as tunnels, sewer lines, or the like. The name commonly given to such a material is "grout". A variety of compositions have been utilized for this purpose. Mixtures of acrylamide and N,N'methylenebisacrylamide have been commonly used for controlling water infiltration into these structures over the past twenty years. Such mixtures are usually injected in the form of an aqueous solution into the earthen formation adjacent to the tunnel, well, sewer lines, and the like along with a catalyst which, after a short period of time, causes these vinyl type monomers to polymerize. The result is a fragile gel-like material containing 80 to 95% water which, in effect, stops or reduces water infiltration. The process is described, in part, in several U.S. patents such as U.S. Pat. Nos. 2,801,983, 2,940,729, 3,223,163, and 4,094,150. Certain disadvantages of the process have been recognized in the art, including the toxicity of the monomers, the fragile nature of the resultant gel, and poor adhesive qualities. The toxicity of the monomers becomes a problem through unavoidable handling practices, spills and through contamination of ground water caused by incomplete polymerization.

More recent art (U.S. Pat. No. 4,155,405) has shown that polyacrylamide with a molecular weight of at least two million will react with dialdehydes to form gels in not less than 24 hours at pH values of about 6.5 to 8.5. When the pH is increased, gels with set times in the order of 10–15 minutes are formed. Such gels, however, are ultimately unstable.

Gel set time is a very important parameter for many applications of grout and very often the only parameter used to characterize gels. It is often desirable to have a gel form and become rigid in times as short as a few seconds. In other applications, a preferred time might be several minutes. For example, in the sewer grouting process, it is desirable to have gel times of 15 to 60 seconds thereby reducing the cost per mile of treating the sewer. If the gel does not form and achieve adequate strength quickly (i.e., have a short gel time), there is danger of the material being expelled or washed away by the hydrostatic head of ground water when the injection equipment is moved. Some gel forming compositions cannot be adjusted to give desirable ranges of set times under the different conditions encountered in the particular application. Such conditions include summer and winter temperatures, sunlight which can trigger premature gelation, and dilution by ground water. Some compositions produce fragile gels whose sealing action fails when the earth around the structure shifts. Other compositions produce gels which have poor adhesion to the structure or surrounding formation or which, as indicated above, are unstable.

Accordingly, there exists a need in the art for a polymeric gel that is formed from nontoxic materials, that has a wide range of set times, that has good adhesion to common structural materials, that is stable and that is tough and yet plastic. It is an object of my invention to provide novel polymeric gels which satisfy this need. Other objects and advantages of the invention will be apparent from the following description.

SUMMARY OF THE INVENTION

I have found that the above-stated objects of my invention are achieved by preparing polymeric gels from a uniform dispersion of a water soluble acrylamide polymer or copolymer having a molecular weight of from about $10^2$ to about $10^7$ in the water insoluble reaction product of a water soluble adhehyde of the formula $$(OHC)_a R_b$$

wherein
(a) R is selected from the group consisting of H, aliphatic, and substituted aliphatic and arylaliphatic wherein the aryl group is not adjacent an OHC group,
(b) a is an integer of 1 or more, and
(c) b is 0 or 1, with the proviso that
(d) a is 1 when R is H and
(e) when b is 0, a is 2 with a water soluble primary amine of the formula $$(H_2N)_c R'_d$$

wherein
(a) R' is selected from the group consisting of H, aliphatic and substituted aliphatic and arylaliphatic wherein the aryl group is not adjacent an $H_2N$ group,
(b) c is an integer of 1 or more, and
(c) d is 0 or 1, with the proviso that
(d) c is 1 when R' is H, and
(e) when d is 0, c is 2,
which polymer or copolymer, aldehyde and amine components are present in adequate proportions to form a polymeric gel.

The polymeric gels of my invention are prepared by forming a uniform dispersion as described above and allowing the dispersion to react to form a polymeric gel.

The aldehyde and the amine components may not be premixed as such a mixture forms a precipitate or suspension. There are specific ranges of component concentrations which form stable gels in relatively short times under ambient temperature conditions.

Gels prepared according to this invention have many desirable properties such as preparation from relatively non-toxic components, superior adhesion, toughness and water impermeability. The gels may be tailored to have set times from a few seconds to a few hours. The gels have many used such as adhesives, sealing cracks and joints in pipes, stabilizing earthen formations, water proofing subgrade construction and as intermediates in the preparation of films, filaments, fibers and membranes. In addition, the novel gels may be treated with carbon dioxide to provide a color change and additional surface hardness.

DETAILED DESCRIPTION

The invention results from the discovery that an intimate uniform dispersion of certain water soluble acrylamide polymers or copolymers in the water insoluble reaction products of certain aldehydes and primary amines produces polymeric gels having unique properties. A convenient method of preparing such dispersions is to contact the selected aldehydes and amines in aqueous solution in the presence of dissolved polyacrylamide. The reaction between the aldehydes and amines is very rapid at substantially ambient temperatures and produces a gel which incorporates all the water present.

Investigation has revealed that not all aldehydes and amines produce materials useful in accordance with the invention. Only primary amines function in accordance with the invention and only aliphatic or aliphatic behaving aldehydes and amines are operable. Thus aldehydes and amines having aromatic groups not adjacent the reactive aldehyde (CHO) or amine ($H_2N$) group behave as aliphatic groups.

In accordance with the invention, a uniform dispersion of the polymer or copolymer in the water insoluble reaction product of the selected aldehyde and amine is prepared. This may be accomplished by first preparing dilute (aqueous) solutions of the polymer or copolymer, the aldehyde and the amine. Generally it is desirable to use as few liquids or solutions as possible. Thus, the polymer or copolymer may be included in one or the other of the solutions, or both, if desired. Gel formation is initiated by bringing the solutions together in proper proportions whereupon a chemical reaction occurs. The elapsed time between when the components are mixed and the gel formation is known as "gel time".

The reaction producing the gel depends upon the formation of chemical bonds between the aldehyde and amine and, in general, requires adequate mixing. This is in contrast to free radical polymerization which can be initiated at some point of a given mass and the reaction proceeds throughout the mass. In the present invention, however, complete mixing and complete stoichiometry are not necessary to produce a gel since the effect depends upon dispersing the polymer in some minimum quantity of insoluble reaction product of the aldehyde and amine.

The polymer, i.e., the acrylamide polymer, may be used in the form of a homopolymer of the amide:

$$CH_2=CR^2-CONH_2$$

in which $R^2$ may be H, $CH_3$, or other alkyl group. The acrylamide polymer may also be reacted with the aldehyde to produce a new polymer thereby requiring only the amine to produce gels according to the invention. The polymer may also be used in the form of copolymers of such an amide with another unsaturated compound as, for example, styrene, vinyl acetate, alkyl acrylate or alkyl methacrylate, acrylic acid or methacrylic acid, acrylonitrile, acrolein, and N,N-methylenebisacrylamide. The polymers which may be employed in the process may have a molecular weight from about $10^2$ to about $10^7$. The concentration of the polymer in the gel may range from about 0.05% to about 20% by weight, with the upper limit being established by the difficulty in pumping viscous solutions and the ability to achieve adequate mixing.

Aldehydes useful in accordance with the invention are water soluble and have the formula $$(OHC)_a R_b$$

wherein
(a) R is selected from the group consisting of H, aliphatic, and substituted aliphatic and arylaliphatic wherein the aryl group is not adjacent an OHC group,
(b) a is an integer of 1 or more, and
(c) b is 0 or 1, with the proviso that
(d) a is 1 when R is H and
(e) when b is 0, a is 2.

There is no limitation on the carbon content for the R groups as long as the resultant molecule is water soluble. Generally 1-20 carbon atoms is the preferred carbon content with 1-6 being still preferred. When R is substituted aliphatic or arylaliphatic any substituents may be present which are non-reactive with the aldehyde groups and which do not interfere with the gel forming reaction. Illustrative of such groups are amino, ether and ketone groups. In the formula there is no limitation on the value of "a" except as is governed by the length of the carbon content of R. Illustrative useful aldehydes within the preferred practice of the invention include formaldehyde, glyoxal, glutaraldehyde and adipaldehyde.

Primary amines useful in accordance with the invention are water soluble and have the formula $$(H_2N)_c R'_d$$

wherein
(a) R' is selected from the group consisting of H, aliphatic and substituted aliphatic and arylaliphatic wherein the aryl group is not adjacent an $H_2N$ group,
(b) c is an integer of 1 or more, and
(c) d is 0 or 1, with the proviso that
(d) c is 1 when R' is H, and
(e) when d is 0, c is 2.

There is no limitation on the carbon content for the R' group as long as the resultant molecule is water soluble. Generally, 1-20 carbon atoms is the preferred carbon content with 1-6 being still preferred. When R' is substituted aliphatic and arylaliphatic, any substituents may be present which are non-reactive with the amine groups and which do not interfere with the gel forming reaction. Illustrative of such groups are amino, ether and ketone groups. In the formula there is no limitation on the value of c except as governed by the length of the carbon content of R'.

The concentration of the aldehyde and amine may vary widely. In certain of the experiments performed with this invention, for example, a gel was produced even when hexamethylenediamine and glutaraldehyde were present in as little as 0.43 wt. % concentration. This was accomplished with a 0.38 wt. % polymer solution, the polymer being polyacrylamide having a molecular weight of 600,000. Relatively less aldehydes and amines can be used if higher molecular weight polymers are used. The limits will also vary with the type of aldehydes and amines chosen. In general, and as practiced within this invention, the concentration limits of the aldehydes and amines in the final gel are between 0.4 wt. % and 50 wt. % (dry basis). As will be seen in the Examples, the desirable range of concentrations is between about 0.4 wt. % and about 25 wt. %.

The water soluble polymer, either straight chain or branched, may be used in the form of an emulsion, or of a solution. It may be mixed, as stated above, with either or both the aldehyde and amine and as shown in subsequent examples. The minimum acceptable concentration of polymer is determined by that concentration at which the aldehyde and amine no longer produce a precipitate but produce a gel for a given chemical system. This, too, is illustrated in the examples, particularly Example 5. The limits of concentration of polymer in the final gel, on a dry weight basis, are of the order of 0.05% to 20%, with the upper limit being established mainly by the molecular weight, the inherent difficulty of pumping viscous solutions, and the ability to achieve adequate mixing. In some cases it may be convenient to employ relatively high concentrations of low molecular weight polymers which have lower inherent viscosity and thereby avoid the difficulty of handling viscous solutions. In other cases, such as where it is desired to control a high rate groundwater infiltration in a well or mine, it may be desirable to employ high molecular weight polymers thereby producing a viscous fluid not easily displaced by the rapid influx of water prior to gel formation. Hence, the useful range of molecular weights may range from 100 ($10^2$) to greater than 10 million ($10^7$). However, in general, the desirable range is from about 2000 to about 1 million.

In soil stabilization or sewer grouting, the components are usually mixed and then conducted to the desired site in the soil or pipe in a time less than the gel time where the gel forms an intimate mixture with the gravel, sand, rock or soil as the case may be. In other cases, the gel may be formed and then further processed or applied at a different location.

The gel time is influenced by factors other than the specific components and their concentrations, temperature, and the like. It may also be influenced by the addition of reagents such as fillers, catalysts, plant growth inhibitors and moisture retention aids of the type known in the art.

The gels described in the examples below were characterized by gel time, color, syneresis or lack thereof, adherence to various materials, and resistance to penetration. It was observed that the gels did not allow penetration in the manner as do tars and greases but, rather, deformed. This was interpreted as a resistance to deformation and was measured by the deformation caused by metal rods having a surface area of 0.22 sq cm and various weights. By calibration, all the penetration data were converted to that corresponding to a deformation caused by a rod whose weight corresponded to a pressure of 180 g/sq cm, a value not unlike that encountered in many applications. The value of the deformation is reported as "d" in the examples.

All of the gels formed by using glutaraldehyde, as typically illustrated in Examples 1-3, exhibited striking color changes over a period of several days. Except in cases where the amine was colored, the gels were white when initially formed, but within 24 hours an intense color began to form. This was always bright red if the amine itself was colorless. If the amine was colored, such as the polyamide HPA No. 2 (dark brown), the red color was influenced by the original amine color. This color change always began to be exhibited on the surface of the gel exposed to air and gradually penetrated to the interior. As time progressed, the surface color would become more intense with the interior exhibiting various shades of red and pink. Eventually the whole mass would become the same intense color, this generally requiring 7 to 10 days. In the early stages, a marked increase in the toughness of the surface exposed to the air was also noted.

The red color was found to be the result of the reaction of carbon dioxide. This was confirmed by allowing the surface of a freshly prepared white gel (glutaraldehyde + hexanediamine + polyacrylamide) to become wet with a thin film of a dilute solution of hydrochloric acid and then placing thereon a small quantity of solid sodium bicarbonate. All areas of the gel adjacent to the sodium bicarbonate took on the characteristic intense red color immediately, but other areas of the gel remained unchanged over the next few minutes. The role of carbon dioxide was further confirmed by the preparation of a sample of gel in a glass tube which was promptly sealed. A sample prepared from the same solutions and in the same proportions, when exposed to air, became pink within minutes and gradually red. The sample sealed in glass was yellowish-white but became slightly pink after 2 days, due to the carbon dioxide in air sealed in the tube with the gel. No further color change occurred over the next 30 days.

Use of the gels of the invention to seal cracks or joints with a water impermeable polymeric gel or to prevent water permeation of a porous structural material is accomplished by either injecting into the cracks or joints or applying to the structural material a gel forming dispersion in accordance with the invention and allowing the dispersion to react to form a polymeric gel The reaction takes place readily over a wide range of ambient temperature conditions.

Filaments and films can be easily formed from compositions prepared in accordance with the invention at their gel point—that is, at the point just before complete solidification occurs. Formation of such filaments and films was accomplished by conventional fiberdrawing and film-casting techniques well known by those skilled in the art. Glutaraldehyde was particularly useful as the aldehyde for this purpose. Polyamines with molecular weight up to 260 are preferable over simple alkylamines for this purpose and use of an excess of amine is preferred. Uses for such filaments and films include textile materials, fire-resistant materials, separation membranes, and also in temperature sensing devices and devices for conversion of chemical energy to mechanical energy at the critical point of the gels.

The polymeric gels in accordance with the invention were also found to be useful as adhesives. Gels prepared from n-butylamine were particularly effective as adhesives.

The invention will be further illustrated by consideration of the following examples, which are intended to be purely exemplary of the invention and its uses. Certain information is common to most or all of the examples, and therefore is summarized as follows: All concentrations are based upon dry weight. The designation PAM in the tables is for polyacrylamide having a molecular weight of 520,000 to 600,000 (except where designated otherwise). All polyacrylamide samples were prepared by the well-known persulfate-sulfite catalyzed polymerization of the monomer. The term "molemer" in the table is the weight of the polymer divided by the molecular weight of the monomer unit. The resultant number indicates the relative number of amine groups in the polymer. In certain of the tables, the term "mole ratio" is used. This is the ratio of the moles of a dialdehyde to the sum of the moles of a diamine plus ½ the molemer of the polymer. The term "matrix concentration" is derived from the combined weight of aldehyde and amine.

Although the source of the reactants is not critical to the invention, for a full explanation of the examples: the 1,6-hexanediamine was a commercial 70% solution obtained from Celanese Chemical Co.; the commercial grade glutaraldehyde was obtained from Union Carbide Corp. as a 50% solution; 1,3-propanediamine was obtained from Jefferson Chemical Co.; n-butylamine from Eastman Kodak Co.; and all other amines from Union Carbide Corp. The very high molecular weight polymer in Example 9 was obtained from Aldrich Chemical Company.

EXAMPLE 1

Five ml of a 5% aqueous solution of polyacrylamide, having a molecular weight of 75,000, were mixed with five ml of tap water and 0.03 ml of a 70% aqueous solution of 1,6-hexanediamine and stirred well to accomplish complete dissolution of the polyacrylamide. Then 0.69 ml of a 50% aqueous glutaraldehyde solution was rapidly injected into the polymer-amine solution, with mixing. The mixture, a liquid, turned to a white gel in 25 seconds. The temperature of both solutions prior to mixing was 27° C., and there was no significant change in temperature during the reaction. (A rise of 4°–5° C. occurs when more concentrated solutions are mixed.) There was no residual liquid, and no liquid was released when stored in a sealed container for over a month at room temperature.

EXAMPLE 2

Five ml of a 5% aqueous solution of polyacrylamide having a molecular weight of 600,000 were mixed with twenty ml of tap water and 0.3 ml of a 70% aqueous solution of 1,6-hexanediamine and stirred well to accomplish complete dissolution of the polyacrylamide. Then a solution of 0.55 ml of 50% aqueous solution of glutaraldehyde, in 20 ml of additional tap water, was rapidly transferred into the first solution with gentle agitation. The liquid mixture turned to a white gel in 40 seconds. The initial temperature of both solutions was 18° C. There was no residual liquid, and no liquid was released during a period of over 6 weeks when stored in a sealed container at room temperature.

EXAMPLE 3

Five ml of a 10% aqueous solution of polyacrylamide, having a molecular weight of 600,000 were mixed with 15 ml of tap water and 1.3 ml of 50% aqueous solution of glutaraldehyde. The mixture was stirred well to accomplish complete dissolution of the polyacrylamide. Then 1.2 ml of 70% aqueous solution of 1,6-hexanediamine were added rapidly with gentle agitation. The mixed liquid solution became a white gel in 25 seconds. The initial temperature of the solutions was 26° C. No residual liquid was noted, and no liquid was released over a period of 62 days.

EXAMPLE 4

A series of tests was performed using two different aldehydes and two different amines with and without the presence of the polymer (PAM). Where the PAM was used, it was pre-mixed with the amine prior to contact with the aldehyde. All tests were conducted at 25° C. The data for these tests are shown in Table 1. As can be seen, mixing of the two matrix-forming materials without the polymer produced an insoluble solid (precipitate) which could readily be separated from the water by filtration.

TABLE 1

| Matrix Forming Components | | | | Polymer | | |
| --- | --- | --- | --- | --- | --- | --- |
| A | | B | | C | Conc. % | Reaction Products |
| Formaldehyde | (3.0%) | Polyamine | (4.4%) | — | None | Brown precipitate in 5 hours |
| " | (2.5%) | " | (2.2%) | PAM | 1.7 | Clear brown gel in 53–68 hours |
| Glutaraldehyde | (9.4%) | 1,6-hexanediamine | (11.4%) | — | None | Immediate yellow precipitate |
| " | (9.8%) | " | (12.8%) | PAM | 0.6 | White gel formed in 80 seconds |
| Glutaraldehyde | (2.7%) | Polyamine | (2.3%) | — | None | Brown precipitate in 9 minutes |
| " | (2.5%) | " | (2.3%) | PAM | 0.6 | Clear brown gel in 90 seconds |

EXAMPLE 5

A series of tests was conducted to determine the concentration of the various ingredients, and the ratios thereof, necessary to produce a stable gel. The procedures were generally the same as used in Examples 1–3. The data are listed in Table 2. All tests were conducted in a temperature range of 24.5° to 26.5° C. In the first series of data, only a precipitate resulted from the mixture of the three components. In the second series of data, the conditions produced a gel; however, syneresis (loss of water) was exhibited, usually within two days. No water loss after 30 days was noted for the gels in the third series of tests.

TABLE 2

| Matrix Forming Components | | | | Polymer | | | Gel | | |
| --- | --- | --- | --- | --- | --- | --- | --- | --- | --- |
| A | moles × 1000 | B | moles × 1000 | C | molemer × 1000 | mole ratio | set time | matrix conc., % | polymer conc., % |
| Glutaraldehyde | 4.2 | 1,6-hexanediamine | 7.0 | PAM | 1.4 | 0.55 | ppt | 3.1 | 0.26 |
| " | 3.8 | " | 3.4 | " | 3.5 | 0.74 | ppt | 0.8 | 0.24 |
| " | 3.8 | " | 2.4 | " | 3.5 | 0.92 | ppt | 0.6 | 0.24 |
| " | 4.2 | " | 3.5 | " | 0.7 | 1.1 | ppt | 4.2 | 0.26 |
| " | 8.4 | " | 7.0 | " | 0.7 | 1.1 | ppt | 7.9 | 0.26 |
| Glutaraldehyde | 3.8 | 1,6-hexanediamine | 2.4 | PAM | 3.5 | 0.92 | 40 sec | 7.9 | 0.24 |
| " | 2.1 | " | 1.7 | " | 0.7 | 1.0 | 45 sec | 3.0 | 0.36 |
| " | 8.8 | " | 6.8 | " | 3.5 | 1.0 | 40 sec | 2.9 | 0.43 |
| " | 5.3 | " | 3.4 | " | 3.5 | 1.0 | 30 sec | 1.6 | 0.44 |
| " | 3.0 | " | 1.1 | " | 3.5 | 1.1 | 22 sec | 0.9 | 0.55 |
| " | 7.6 | " | 4.8 | " | 3.5 | 1.2 | 20 sec | 2.4 | 0.45 |

TABLE 5

| Matrix Forming Components | | | | Polymer | | | Gel | | |
|---|---|---|---|---|---|---|---|---|---|
| A | moles × 1000 | B | moles × 1000 | C | molemer × 1000 | mole wt. | set time | matrix conc., % | polymer conc., % |
| Glutaraldehyde | 3.0 | 1,6-hexanediamine | 1.1 | PAM | 3.5 | 520,000 | 22 sec | 0.9 | 0.55 |
| " | " | " | " | " | " | 75,000 | 20 sec | " | " |
| Glutaraldehyde | 3.0 | 1,6-hexanediamine | 1.1 | PAM | 7.0 | 520,000 | 18 sec | 0.9 | 1.09 |
| " | " | " | " | " | " | 75,000 | 14 sec | " | " |
| Glutaraldehyde | 3.0 | 1,6-hexanediamine | 1.1 | PAM | 10.5 | 520,000 | 19 sec | 0.9 | 1.64 |
| " | " | " | " | " | " | 75,000 | 11 sec | " | " |

EXAMPLE 10

Mixed amines were also utilized to produce gels according to the invention. Five ml of a 5% aqueous solution of polyacrylamide, having a molecular weight of 600,000, were mixed with 25 ml of tap water, 0.9 ml of polyamine and 0.2 ml of 1,6-hexanediamine (70%) and stirred well to accomplish complete dissolution. Thereafter, 0.98 ml of 50% aqueous solution of glutaraldehyde in 25 ml of additional tap water were quickly poured into the first solution with gentle agitation. The liquid turned to a brownish gel in 85 seconds. The initial temperature of both solutions was 25° C. There was no residual liquid, and no liquid was released over a period of two months in a sealed container. A similar test was made except four times the amount of glutaraldehyde was used. The gel time of the resultant gel was about the same (85 sec), and the deformation was 26 compared to 42 for the first test. Gels produced without the polyamine had gel times about one-half of these values.

EXAMPLE 11

A typical application of the gels formed according to the invention was tested. Two pieces of six inch vitrified clay sewer pipe were placed in a wooden box and surrounded with sand. The joint was sealed using a gel based upon hexanediamine and glutaraldehyde, using a conventional packer positioned within the pipes at the joint. Solutions from two small tanks were conducted through flow meters and valves into the packer through separate hoses. One tank contained 5 liters of a 4.3% solution of a branched polyacrylamide with 177 ml of 70% 1,6-hexanediamine; the other tank contained 5 liters of the same polyacrylamide solution and 554 ml of 50% glutaraldehyde. The valves were opened and the solutions allowed to flow into the pipe joint until no further flow occurred (approximately one minute). After waiting approximately 5 minutes, the packer equipment was removed and the outside of the pipe flooded with water. No leak was observed at the joint between the pipes. The joined pipes were exposed and separated; good adhesion of the gel to the pipe pieces was observed.

EXAMPLE 12

An experiment was conducted to determine the effect of a gel formed according to the invention upon the permeability of a construction-grade concrete block. An open-ended plastic tube (55 mm dia) was cemented to the 8 in thick block with a silicone rubber adhesive. The tube was filled with 150 ml water, and the time for drainage of the water through the block was determined to be 75 seconds.

A solution of 0.4% polyacrylamide and 4% tetraethylenepentamine was applied with a brush to the block inside the tube as well as adjacent to the exterior of the tube. After allowing 2-3 min for the first solution to be absorbed, a 25% solution of glutaraldehyde was sprayed upon the surface. After a time period of 15 minutes, the tube was refilled with 250 ml water. The time for all of the water to pass through the block increased to 286 seconds. A more concentrated second sealant coat was then applied to the block. This second coat was prepared by first applying a soluton containing 3.9% of branched polyacrylamide and 9% tetraethylenepentamine to the block followed by a spray of 25% glutaraldehyde. After a 15 min delay to ensure complete formation of a gel, the tube was refilled with 250 ml water. No measurable loss of water occurred in the following 4 hours.

In view of the foregoing examples of producing a stable water-insoluble gel, and uses thereof, one of ordinary skill in the art will recognize that constituents closely related to those specifically illustrated may be substituted in carrying out the invention. For a specific application, the particular components and ratios thereof may be chosen to provide the desired viscosity and gel time to accomplish the beneficial result of the invention.

The number of components for the practice of the invention is not limited to three. Example 10 was given as an illustration of using a mixture of two amines in the practice of the invention. Additional amines, or aldehydes, may be utilized to impart desired characteristics to the resultant gel. Similarly, a compatible mixture of polymers may be employed. Addition of other materials known in the art to impart strength and/or rigidity, may be incorporated into the gel. One such additive is diatomaceous earth as described in U.S. Pat. No. 4,094,150. Addition of materials, such as calcium chloride, to improve water retention may be used. Similarly, chemicals for inhibiting microbial growth or root growth, of the types known in the art, may be incorporated into the gels produced according to this invention.

Gels formed according to this invention may be utilized for purposes other than the above-described formation of a barrier to water permeation. For example, fibers may be formed using extrusion nozzle techniques. The components may be mixed either in the nozzle, or prior to introduction of a mixture into the nozzle, depending upon the gel time of the specific mixture. Fibers may also be produced from the gels using other techniques known in the art.

Films, membranes and other sheet material may be produced from the gels of this invention by conventional techniques. For example, the constituents for the gel are mixed and then applied to the surface of a relatively dense liquid that is nonreactive with the gel or its constituents. The quantity of material applied to the liquid surface is controlled to provide a desired thickness. Films are then produced by dehydration of the thin layers of the gels.

Other embodiments of the invention will be apparent to one skilled in the art from a consideration of this TABLE 2-continued

| Matrix Forming Components | | | | Polymer | | | Gel | | |
|---|---|---|---|---|---|---|---|---|---|
| A | moles × 1000 | B | moles × 1000 | C | molemer × 1000 | mole ratio | set time | matrix conc., % | polymer conc., % |
| Glutaraldehyde | 3.0 | 1,6-hexanediamine | 1.1 | PAM | 10.5 | 0.48 | 19 sec | 0.9 | 1.64 |
| " | 3.0 | " | 1.1 | " | 7.0 | 0.65 | 18 sec | 0.9 | 1.09 |
| " | 3.8 | " | 3.4 | " | 3.5 | 0.74 | 100 sec | 1.4 | 0.44 |
| " | 3.8 | " | 2.4 | " | 3.5 | 0.92 | 25 sec | 2.5 | 0.96 |
| " | 3.7 | " | 0.3 | " | 7.0 | 0.97 | 4 sec | 2.6 | 3.17 |
| " | 12.2 | " | 6.7 | " | 7.0 | 1.2 | 3 sec | 1.1 | 2.71 |

EXAMPLE 6

Using a procedure generally the same as in Example 2, a series of tests was performed to study other aldehyde-amine combinations with PAM. The concentrations and ratios were chosen to produce stable gels. The data are shown in Table 3, where the effect of the constituents and proportions upon the gel time is illustrated. The deformation value, d. was generally below 10 for all of these gels.

TABLE 3

| Matrix Forming Components | | | | Polymer | | Gel | | |
|---|---|---|---|---|---|---|---|---|
| A | moles × 1000 | B | moles × 1000 | C | molemer × 1000 | set time | matrix conc., % | polymer conc., % |
| Formaldehyde | 2.8 | n-butylamine | 2.2 | PAM | 3.5 | 7 hrs | 1.1 | 1.7 |
| " | 3.9 | ethylenediamine | 2.2 | " | " | 60–132 hrs | 1.1 | 1.7 |
| " | 3.9 | 1,3-propanediamine | 2.2 | " | " | 7 hrs | 1.3 | 1.7 |
| " | 6.7 | tetraethylenepentamine | 2.2 | " | " | 7 hrs | 3.5 | 1.7 |
| " | 12.7 | polyamine | 2.2 | " | " | 53–67 hrs | 5.5 | 1.7 |
| " | 4.1 | 1,6-hexanediamine | 2.8 | " | 1.4 | 39–80 hrs | 3.8 | 0.8 |
| Glyoxal | 6.3 | 1,6-hexanediamine | 5.6 | " | 1.4 | 50 sec | 5.5 | 0.5 |
| Glutaraldehyde | 2.8 | n-butylamine | 2.2 | " | 1.4 | 110 sec | 2.4 | 1.7 |
| " | 3.9 | ethylenediamine | 2.2 | " | " | 465 sec | 2.9 | 1.7 |
| " | 3.9 | 1,3-propanediamine | 2.2 | " | " | 1620 sec | 3.1 | 1.7 |
| " | 6.7 | tetraethylenepentamine | 2.2 | " | " | 40 sec | 6.6 | 1.7 |
| " | 12.7 | polyamine | 2.2 | " | " | 55 sec | 11.5 | 1.7 |
| " | 2.8 | 1,6-hexanediamine | 1.1 | " | 10.5 | 25 sec | 0.8 | 1.6 |
| " | 2.1 | ammonia | 1.4 | " | 0.7 | 4–12 hrs | 5.1 | 2.0 |

EXAMPLE 7

Experiments were conducted using three different copolymers instead of polyacrylamide. The first copolymer was of low molecular weight prepared by the persulfate-sulfite initiated polymerization of a solution containing 0.04 moles of dimethylamino-ethylmethacrylate and 0.26 moles of acrylamide. The other two copolymers contained 20:80 and 75:25 mole ratios of dimethyldiallyl ammonium chloride. They were obtained from the Calgon Corporation as WT-2575 and WT-2640, respectively. Five ml of the dimethylamino-ethylmethacrylate copolymer were dissolved in 10 ml of water containing 0.66 ml of 50% glutaraldehyde. This solution was then mixed with 10 ml of water containing 0.61 ml of hexamethylenediamine: a gel formed in 25 seconds. Similarly one ml of each of the other two copolymers, under otherwise identical conditions, produced gels in 55 sec.

EXAMPLE 8

The data in Table 4 were obtained using the general procedure described in Example 2. The data show that lower reaction temperatures increase the gel time. Also, the trend toward shorter gel times with increased polymer concentration may be observed from these data.

All gels described in this table had d values ranging from 34 to 24, with the lower values associated with gels having higher polymer concentrations.

TABLE 4

| Matrix Forming Components | | | | Polymer | | Gel | | | | |
|---|---|---|---|---|---|---|---|---|---|---|
| A | moles × 1000 | B | moles × 1000 | C | molemer × 1000 | set time | Reaction Temp., °C. | mole ratio | matrix conc, % | polymer conc, % |
| Glutaraldehyde | 3.0 | 1,6-hexanediamine | 1.1 | PAM | 3.5 | 40 sec | 18 | 1.1 | 0.9 | 0.55 |
| " | " | " | " | " | " | 22 sec | 25 | " | " | " |
| Glutaraldehyde | 3.0 | 1,6-hexanediamine | 1.1 | PAM | 7.0 | 30 sec | 18 | 0.65 | 0.9 | 1.09 |
| " | " | " | " | " | " | 18 sec | 25 | " | " | " |
| Glutaraldehyde | 3.0 | 1,6-hexanediamine | 1.1 | PAM | 10.5 | 25 sec | 18 | 0.48 | 0.9 | 1.64 |
| " | " | " | " | " | " | 19 sec | 25 | " | " | " |

EXAMPLE 9

The data in Table 5 were obtained by following the procedure described in Example 2. These data show particularly that the lower molecular weight polymers decrease the set time, all other factors being the same. It may also be seen from the table that increasing polymer concentration results in decreased set time and stiffer gels. Although not included in the table, a test was conducted with PAM having a molecular weight of $5-6 \times 10^6$; however, little difference was noted when compared to PAM having a molecular weight of 520,000 to 600,000.

specification or practice of the invention disclosed herein. It is intended that the specification and examples be considered as exemplary only, with the true scope and spirit of the invention being indicated by the following claims.

I claim:

1. A uniform dispersion of a water soluble acrylamide polymer or copolymer useful for reducing or eliminating the flow of water through surfaces and earthen formations, having a molecular weight of from about $10^2$ to about $10^7$ in the water insoluble reaction product of a water soluble aldehyde of the formula $$(OHC)_a R_b$$

wherein
   (a) R is selected from the group consisting of H, aliphatic, and substituted aliphatic and arylaliphatic wherein the aryl group is not adjacent an OHC group,
   (b) a is an integer of 1 or more, and
   (c) b is 0 or 1, with the proviso that
   (d) a is 1 when R is H and
   (e) when b is 0, a is 2
with a water soluble primary amine of the formula $$(H_2N)_c R'_d$$

wherein
   (a) R' is selected from the group consisting of H, aliphatic and substituted aliphatic and arylaliphatic wherein the aryl group is not adjacent an $H_2N$ group,
   (b) c is an integer of 1 or more, and
   (c) d is 0 or 1, with the proviso that
   (d) c is 1 when R' is H, and
   (e) when d is 0, c is 2,
which polymer or copolymer, aldehyde and amine components are present in adequate proportions to form a polymeric gel.

2. The dispersion of claim 1 wherein the concentration of the polymer or copolymer in the dispersion is between about 0.05% to about 20% by weight and wherein the concentration of said reaction product in said dispersion is between about 0.4% to about 25% by weight of said dispersion.

3. The dispersion of claim 2 in which R and R' contain from 1–20 carbon atoms.

4. The dispersion of claim 2 in which R is H.

5. The dispersion of claim 2 in which R' is H.

6. The dispersion of claim 2 in which b is 0.

7. The dispersion of claim 2 in which d is 0.

8. The dispersion of claim 2 in which the molecular weight of the polymer or copolymer is from about $10^3$ to about $10^6$ and wherein the concentration of said reaction product in said dispersion is between about 1% to about 10% by weight of said dispersion.

9. The dispersion of claim 2 in which the said acrylamide polymer is of the type $CH_2=CR^2-CONH_2$ wherein $R^2$ is H or an alkyl group, or a copolymer thereof.

10. The dispersion of claim 9 wherein said water soluble aldehyde is selected from formaldehyde, glyoxal, glutaraldehyde and adipaldehyde.

11. The dispersion of claim 9 wherein said water soluble primary aliphatic amine is selected from ammonia, n-butylamine, 1,6-hexanediamine, hydrazine, polyamines, ethylenediamine, triethylenediamine, diethylenetriamine, triethylenetetramine, tetraethylenepentamine and 1,3-propanediamine.

12. The dispersion of claim 11 wherein said aldehyde is selected from formaldehyde, glyoxal, glutaraldehyde and adipaldehyde.

13. The dispersion of claim 12 in which the molecular weight of the polymer or copolymer is from about $10^3$ to about $10^6$ and in which the concentration of said reaction product in said dispersion is between about 1% to about 10% by weight of said dispersion.

14. A method for preparing a polymeric gel which comprises forming a uniform dispersion as described in claim 1 and allowing the dispersion to react to form a polymeric gel.

15. A method for preparing a polymeric gel which comprises forming a uniform dispersion as described in claim 2 and allowing the dispersion to react to form a polymeric gel.

16. The method of claim 15 in which the polymeric gel so produced is reacted further with $CO_2$.

17. The method of claim 15 in which the dispersion is prepared by mixing the polymer or copolymer, the aldehyde and the amine simultaneously.

18. The method of claim 15 in which the dispersion is prepared by adding either the amine or the aldehyde to a mixture of the polymer or copolymer and the aldehyde or the amine and mixing the resulting composition.

19. The method of claim 15 in which the aldehyde in said dispersion is selected from formaldehyde, glyoxal, glutaraldehyde and adipaldehyde and in which the water soluble primary aliphatic amine in said dispersion is selected from ammonia, n-butylamine, 1,6-hexanediamine, hydrazine, polyamines, ethylenediamine, triethylenediamine, diethylenetriamine, triethylenetetramine, tetraethylenepentamine and 1,3-propanediamine.

20. Polymeric gels produced according to claim 14.

21. Polymeric gels produced according to claim 15.

22. Polymeric gels produced according to claim 19.

23. A method of sealing cracks or joints with a water impermeable polymeric gel which comprises injecting into said cracks or joints a dispersion as described in claim 1 and allowing said dispersion to react to form a polymeric gel.

24. A method of sealing cracks or joints with a water impermeable polymeric gel which comprises injecting into said cracks or joints a dispersion as described in claim 2 and allowing said dispersion to react to form a polymeric gel.

25. A method of sealing cracks or joints with a water impermeable polymeric gel which comprises injecting into said cracks or joints a dispersion as described in claim 12 and allowing said dispersion to react to form a polymeric gel.

26. A method of preventing water permeation of a porous structural material which comprises applying to said structural material a dispersion as described in claim 1 and allowing said dispersion to react to form a polymeric gel.

27. A method of preventing water permeation of a porous structural material which comprises applying to said structural material a dispersion as described in claim 2 and allowing said dispersion to react to form a polymeric gel.

28. A method of preventing water permeation of a porous structural material which comprises applying to said structural material a dispersion as described in claim 12 and allowing said dispersion to react to form a polymeric gel.

* * * * *